US010700482B1

(12) United States Patent
Vela

(10) Patent No.: US 10,700,482 B1
(45) Date of Patent: Jun. 30, 2020

(54) RETROFIT KIT WITH EXTENDABLE AND RETRACTABLE ELECTRICAL SOCKETS FOR ELECTRICAL GANG BOXES

(71) Applicant: Richard Vela, San Fernando, CA (US)

(72) Inventor: Richard Vela, San Fernando, CA (US)

( * ) Notice: Subject to any disclaimer, the term of this patent is extended or adjusted under 35 U.S.C. 154(b) by 0 days.

(21) Appl. No.: 16/409,843

(22) Filed: May 12, 2019

(51) Int. Cl.
*H01R 27/02* (2006.01)
*H01R 43/20* (2006.01)
*H01R 13/66* (2006.01)
*H01R 25/00* (2006.01)

(52) U.S. Cl.
CPC ........... *H01R 27/02* (2013.01); *H01R 13/665* (2013.01); *H01R 25/006* (2013.01); *H01R 43/20* (2013.01)

(58) Field of Classification Search
CPC ......... H01R 13/72; H02G 11/02; H02G 3/086
See application file for complete search history.

(56) References Cited

U.S. PATENT DOCUMENTS

| 3,566,332 | A | * | 2/1971 | Bonhomme | H01R 13/72 |
| | | | | | 439/501 |
| 3,920,308 | A | * | 11/1975 | Murray | H02G 11/02 |
| | | | | | 439/501 |
| 4,282,954 | A | * | 8/1981 | Hill | H02G 11/02 |
| | | | | | 191/12.4 |
| 4,725,697 | A | * | 2/1988 | Kovacik | H02G 11/02 |
| | | | | | 191/12.4 |
| 5,114,365 | A | * | 5/1992 | Thompson | H01R 24/76 |
| | | | | | 174/66 |
| 5,236,371 | A | * | 8/1993 | Matthis | H02G 11/02 |
| | | | | | 439/501 |
| 5,494,446 | A | * | 2/1996 | DeLucia | H01R 13/72 |
| | | | | | 439/4 |
| 5,518,417 | A | * | 5/1996 | Liu | H01R 13/72 |
| | | | | | 242/379 |
| 5,562,488 | A | * | 10/1996 | Neiser | H01R 13/514 |
| | | | | | 439/373 |
| 5,679,925 | A | * | 10/1997 | Dilley | H01R 13/72 |
| | | | | | 174/53 |
| 5,700,150 | A | * | 12/1997 | Morin | H01R 13/72 |
| | | | | | 191/12.4 |
| 5,700,158 | A | * | 12/1997 | Neiser | H01R 13/641 |
| | | | | | 439/373 |
| 5,701,981 | A | * | 12/1997 | Marshall | H02G 11/02 |
| | | | | | 191/12.4 |
| 5,723,815 | A | * | 3/1998 | Pena | H02G 11/02 |
| | | | | | 174/135 |
| 5,738,548 | A | * | 4/1998 | Rutulante | H01R 13/72 |
| | | | | | 439/4 |
| 6,059,081 | A | * | 5/2000 | Patterson | H02G 11/02 |
| | | | | | 191/12.2 A |

(Continued)

*Primary Examiner* — Ross N Gushi
(74) *Attorney, Agent, or Firm* — Pete Adams Law, PLLC

(57) ABSTRACT

Electrical devices must often be used at distances from wall outlets longer than their respective power cords. Extension cords frequently become entangled and take up floor space, creating tripping hazards. The extendable and retractable sockets disclosed are retrofit kits that can be inserted into commonly used electrical outlet gang boxes. To install, a user simply removes a wall outlet cover, removes the prior existing two socket outlet, and installs one of the retrofit kits. Once installed, the electrical sockets may be extended and retracted to the desired length for connecting electrical devices.

20 Claims, 19 Drawing Sheets

(56) References Cited

U.S. PATENT DOCUMENTS

| | | | | |
|---|---|---|---|---|
| 6,087,587 A * | 7/2000 | Gonzalez | H01R 13/652 | 174/135 |
| 6,346,006 B1 * | 2/2002 | Smith | H01R 13/72 | 439/501 |
| 6,416,355 B1 * | 7/2002 | Liao | H01R 13/6658 | 439/164 |
| 6,447,330 B1 * | 9/2002 | Neiser | H01R 13/72 | 191/12.2 R |
| 6,619,981 B2 * | 9/2003 | Neiser | H01R 13/72 | 439/501 |
| 6,648,677 B1 * | 11/2003 | Boyd | H01R 13/72 | 439/501 |
| 6,659,246 B2 * | 12/2003 | Chen | H02G 11/02 | 191/12.2 R |
| 6,774,307 B2 * | 8/2004 | Kruse | H02G 3/18 | 174/53 |
| 7,000,746 B2 * | 2/2006 | Mackin | H02G 11/02 | 191/12.4 |
| 7,309,834 B1 * | 12/2007 | Byrd | B65H 75/425 | 174/135 |
| 7,857,659 B2 * | 12/2010 | Wang | G06F 1/16 | 439/501 |
| 8,137,129 B2 * | 3/2012 | Woods | B60R 16/0215 | 439/501 |
| 8,292,656 B2 * | 10/2012 | Mydlarz | H01R 13/60 | 439/501 |
| 9,083,180 B2 * | 7/2015 | Dodal | H02H 3/16 | |
| 9,161,464 B2 * | 10/2015 | Liao | H05K 5/0065 | |
| 9,496,726 B2 * | 11/2016 | Frid | H02J 7/0021 | |
| 9,553,433 B2 * | 1/2017 | Lalancette | H02G 3/08 | |
| 9,876,324 B2 * | 1/2018 | Gorin | H01R 25/006 | |
| 9,917,453 B1 * | 3/2018 | Banon | H02J 7/0042 | |
| 9,960,539 B2 * | 5/2018 | Tymus | H01R 13/6395 | |
| 10,074,948 B2 * | 9/2018 | Goyal | H01R 13/6395 | |
| 10,116,102 B2 * | 10/2018 | Randall | H02J 7/0045 | |
| 10,177,585 B2 * | 1/2019 | Hinojosa | H02J 7/0045 | |
| 10,199,783 B2 * | 2/2019 | Finn | H01R 13/514 | |
| 2004/0121648 A1 * | 6/2004 | Voros | H01R 31/02 | 439/535 |
| 2008/0012423 A1 * | 1/2008 | Mimran | H01R 25/003 | 307/11 |
| 2011/0215759 A1 * | 9/2011 | Lee | H01R 13/60 | 320/115 |
| 2012/0320546 A1 * | 12/2012 | Wu | H02G 11/02 | 361/755 |
| 2013/0244475 A1 * | 9/2013 | Sayadi | H01R 13/72 | 439/501 |
| 2015/0038006 A1 * | 2/2015 | Jansen | H02J 7/0021 | 439/535 |
| 2015/0188342 A1 * | 7/2015 | Wu | H02J 7/0042 | 320/107 |
| 2018/0126932 A1 * | 5/2018 | Secord | H01R 27/02 | |
| 2018/0359873 A1 * | 12/2018 | Shemirani | H01R 31/06 | |

\* cited by examiner

RETROFIT KIT WITH EXTENDABLE AND RETRACTABLE ELECTRICAL SOCKETS FOR ELECTRICAL GANG BOXES

BACKGROUND OF THE INVENTION

1. Field of the Invention

The present invention relates generally to interior wall electrical outlets. More particularly, it relates to a retrofit kit with extendable and retractable sockets that can be mounted into existing electrical outlet gang boxes.

2. Description of Related Art

Electrical devices must often be used at distances from wall outlets longer than their respective power cords. The typical solution is for users to employ long extension cords to reach the desired length. Extension cords frequently become entangled and take up floor space, creating tripping hazards.

Electrical gang boxes are commonly used in walls in industrial, commercial, and residential settings. Although extendable and retractable electrical sockets are known to be implemented in custom designed wall outlets, it is undesirable to remove existing electrical gang boxes and replace them with custom wall outlets. Therefore, there is a need in the art for a retrofit kit that adds extendable and retractable electrical sockets to existing gang boxes enabling a user to plug in electrical devices at various distances.

SUMMARY OF THE INVENTION

The embodiments disclosed are electrical retrofit kit apparatuses ("Retrofit Kits") that can be inserted into commonly used electrical outlet gang boxes. They are designed as a "retrofit" design, meaning they can fit into any existing 2 socket outlet gang box. To install, a user simply removes a wall outlet cover, removes the prior existing two socket outlet, and installs one of the Retrofit Kits. Once installed, the electrical sockets may be extended and retracted to the desired length for connecting electrical devices.

Electrical sockets described herein are either static or dynamic. "Dynamic electrical sockets" are both extendable and retractable sockets. Likewise, a "dynamic cord" or cable is both an extendable and retractable cord that is electrically connected to a dynamic electrical socket. A "static" socket does not have a retractable and extendable cord. One embodiment includes a dynamic three prong socket and a dynamic USB socket. Another embodiment includes two dynamic USB sockets. A third embodiment includes two dynamic three prong sockets. A fourth embodiment includes a static three prong socket and a dynamic USB socket. A fifth embodiment includes a static three prong socket and a dynamic three prong socket.

BRIEF DESCRIPTION OF THE DRAWINGS

To further clarify various aspects of some embodiments of the present invention, a more particular description of the invention will be rendered by references to specific embodiments thereof, which are illustrated in the appended drawings. It is appreciated that these drawings depict only typical embodiments of the invention and are therefore not to be considered limiting of its scope. The invention will be described and explained with additional specificity and detail through the accompanying drawings.

DETAILED DESCRIPTION OF THE INVENTION

Figure 1:
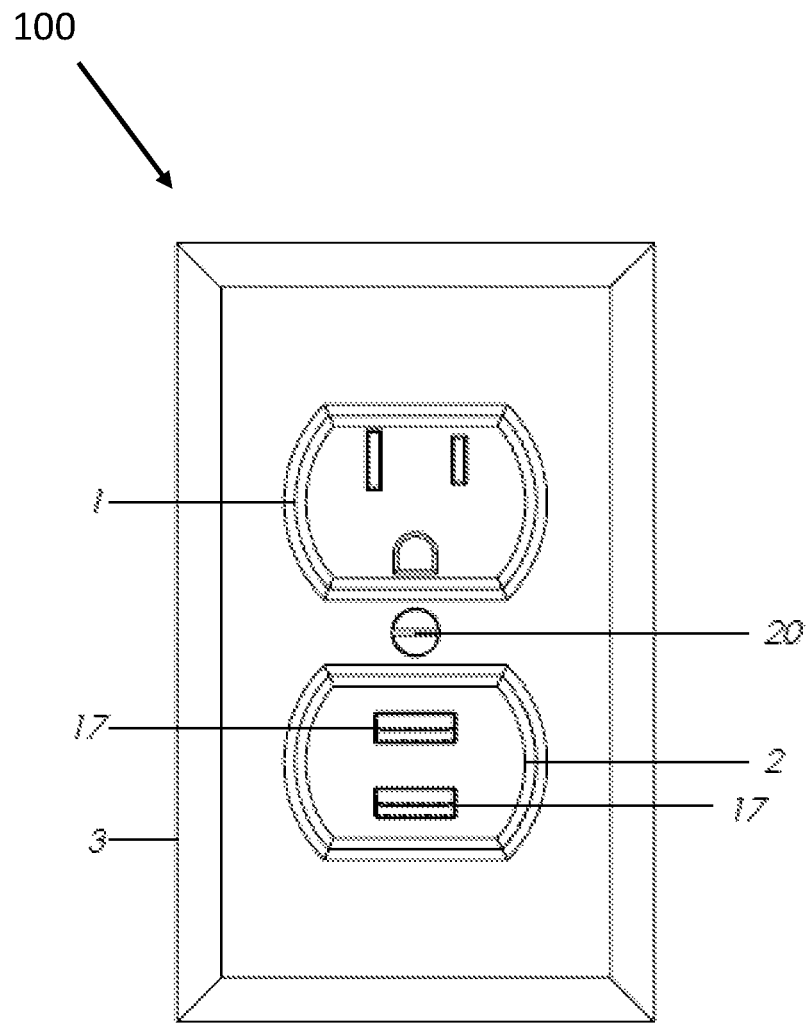
FIG. 1 illustrates a front view of an embodiment 100 with a dynamic three prong socket and a dynamic USB socket.

The following descriptions relate to presently preferred embodiments and are not to be construed as describing limits to the invention, whereas the broader scope of the invention should instead be considered with reference to the claims, which may be now appended or may later be added or amended in this or related applications. Further, the descriptions relate principally to preferred embodiments while a few alternative embodiments may also be referenced on occasion, although it should be understood that many other alternative embodiments would also fall within the scope of the invention. It should be appreciated by those of ordinary skill in the art that the techniques disclosed in these examples are thought to represent techniques that function well in the practice of various embodiments, and thus can be considered to constitute preferred modes for their practice. It should also be understood that terms used are generally intended to have the ordinary meanings that would be understood within the context of the related art, and they generally should not be restricted to formal or ideal definitions, conceptually encompassing equivalents, unless and only to the extent that a particular context clearly requires otherwise.

For purposes of these descriptions, a few wording simplifications should also be understood as universal, except to the extent otherwise clarified in a particular context either in the specification or in particular claims. The use of the term "or" should be understood as referring to alternatives, although it is generally used to mean "and/or" unless explicitly indicated to refer to alternatives only, or unless the alternatives are inherently mutually exclusive. When referencing values, the term "about" may be used to indicate an approximate value, generally one that could be read as being that value plus or minus half of the value. "A" or "an" and the like may mean one or more, unless clearly indicated otherwise. Likewise, "another" object may mean at least a second object or more. Such "one or more" meanings are most especially intended when references are made in conjunction with open-ended words such as "having," "comprising" or "including." Throughout this specification, the words "comprises," "having," or "including," or variations thereof, will be understood to imply the inclusion of a stated step or element or integer or group of steps or elements or elements or integers, but not the exclusion of any other step or element or integer or group of steps, elements or integers.

Reference is made in the specification to the accompanying drawings. The drawings are intended for representative purposes only and should not be considered limiting in any respect. Like reference numerals are used throughout the drawings to depict like or similar elements of the disclosed embodiments. As is well known in the art, Universal Serial Bus ("USB") sockets may be used for transferring both power and data. In the specification and in the accompanying claims, "electrical sockets" include three prong sockets and USB sockets. The term "socket" is used throughout but synonyms such as "receptacle" may be used interchangeably. Electrical sockets described herein are either static or dynamic. "Dynamic electrical sockets" are both extendable and retractable sockets. Likewise, a "dynamic cord" or cable is both an extendable and retractable cord that is electrically connected to a dynamic electrical socket. A "static" socket does not have a retractable and extendable cord.

The embodiments (100, 200, 300, 400, and 500) disclosed are all electrical retrofit kit apparatuses ("Retrofit Kits") that can be inserted into commonly used electrical outlet gang boxes. They are designed as a "retrofit" design, meaning they can fit into any existing two socket outlet gang box. To install, a user simply removes a wall outlet cover, removes the prior existing two socket outlet, and installs one of the Retrofit Kits. Once installed, the electrical sockets may be extended and retracted to the desired length for connecting electrical devices. Although several of the drawings depict a three prong socket above a USB socket, this arrangement is not limiting. Further, although some drawings depict a static electrical socket above a dynamic electrical socket, this arrangement is also not limiting. For example, a USB socket may be placed above a three prong socket in an alternative embodiment. Although a USB socket is depicted as having dual USB ports, alternative embodiments may have one or more USB ports.

Referring to FIG. 1, there is shown a front view of an embodiment 100 with a dynamic three prong socket 1 and a dynamic USB socket 2. Dynamic USB socket 2 is shown with two USB ports 17 although one or more ports 17 may be implemented. A mounting fastener 20 is used to secure the wall outlet cover 3 to an outlet base 11 (shown in FIGS. 8 and 9). The wall outlet cover 3 is removed prior to installing a Retrofit Kit and reattached after installation.

Figure 2:
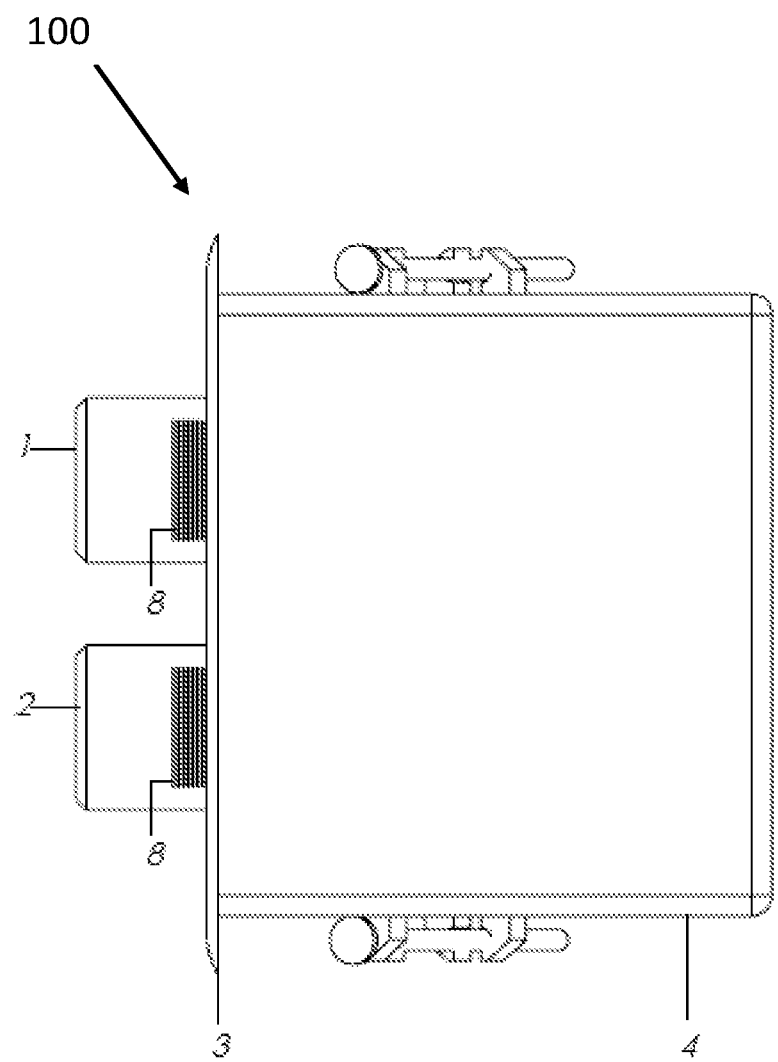
FIG. 2 illustrates a right side view of embodiment 100.

Turning to FIG. 2, there is shown a right side view of embodiment 100. Three prong socket 1 and USB socket 2 protrude from electrical gang box 4 and wall outlet cover 3. Although three prong socket 1 and USB socket 2 are shown here fully retracted, they protrude from the wall outlet cover 3 enabling a user to grip squeeze tabs 8. When a user compresses squeeze tabs 8 and pulls away from wall outlet cover 3, the sockets 1, 2 are extended. Although gang box 4 is a 1-gang box, other sizes and types of gang boxes may be utilized. For example, 2-gang and 3-gang boxes may be implemented as can different size capacity gang boxes. Deeper gang boxes allow for the location and sizing of spring drum assemblies to be changed and allow for longer cable lengths.

Figure 3:
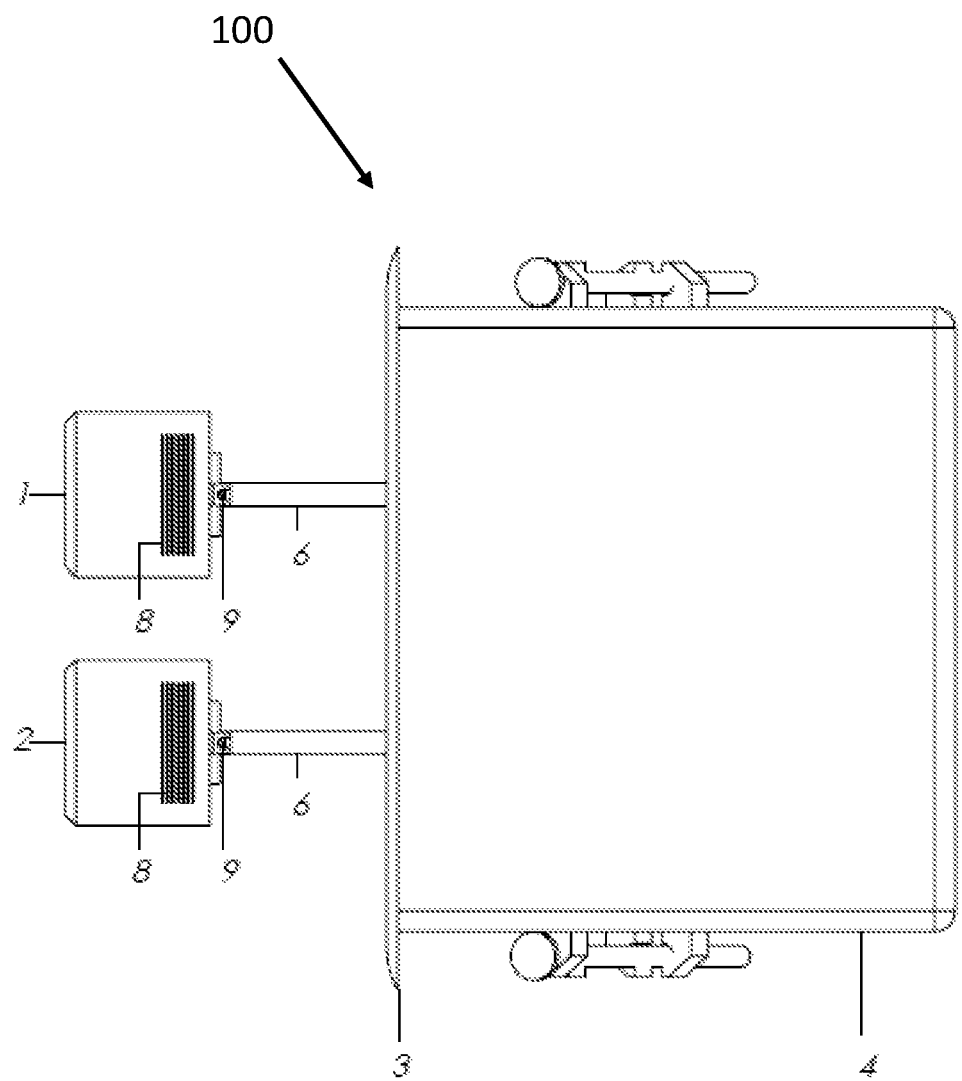
FIG. 3 illustrates a right side view of embodiment 100 with a three prong socket and USB socket partially extended from an electrical gang box.

Turning to FIG. 3, there is shown a right side view of embodiment 100 with three prong socket 1 and USB socket 2 partially extended from gang box 4. When a user compresses squeeze tabs 8, snap lock tabs 9 will disengage from outlet base 11. Once the snap lock tabs 9 are disengaged, the sockets 1, 2 may be extended. Dynamic cords or cables 6 are electrically connected to dynamic sockets 1, 2. As either socket 1, 2 is extended away from gang box 4, a cord 6 extends from gang box 4. The cord 6 may be extended to varying lengths. For example, the length can vary from a few millimetres to six feet. Longer distances than six feet are possible, depending on the size of the gang box 4.

Figure 4:
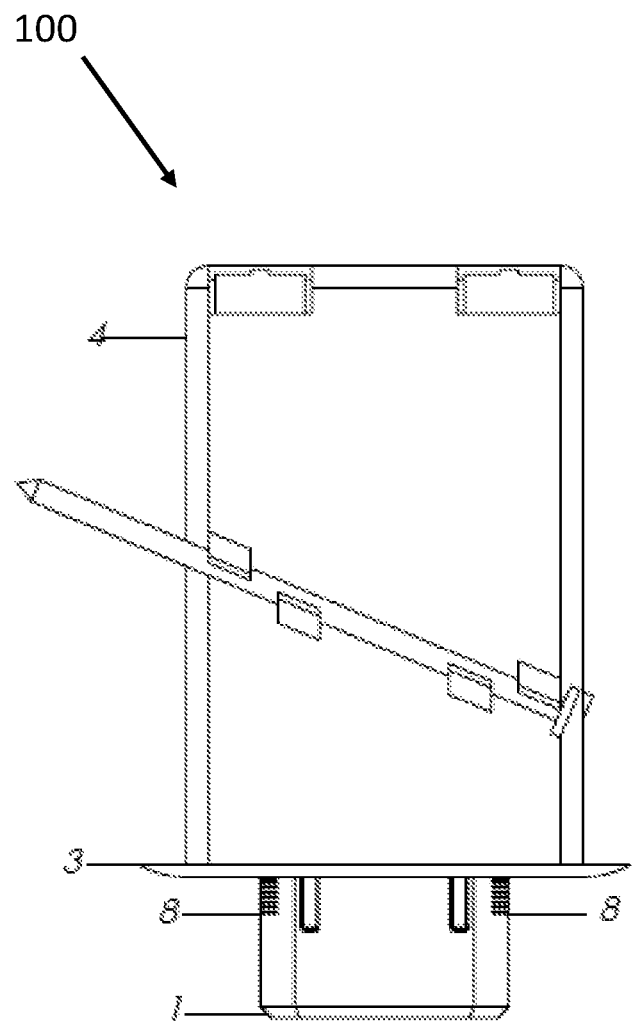
FIG. 4 illustrates a top view of embodiment 100 with the sockets fully retracted.

Turning to FIG. 4, there is shown a top view of embodiment 100 with the sockets 1, 2 fully retracted. As shown, there are squeeze tabs 8 on two sides of three prong socket 1. Although not visible in FIG. 4, USB socket 2 also has squeeze tabs 8 on two sides.

Figure 5:
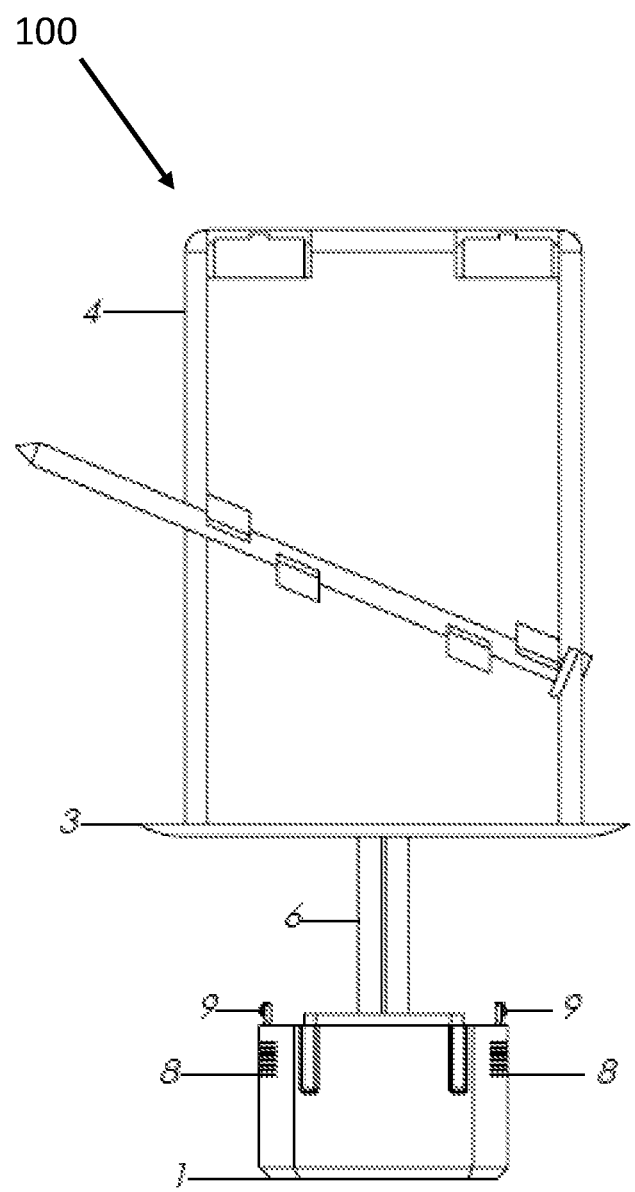
FIG. 5 illustrates a top view of embodiment 100 with the sockets 1, 2 partially extended.

Turning to FIG. 5, there is shown a top view of embodiment 100 with the sockets 1, 2 partially extended. Snap lock tabs 9 are shown disengaged from outlet base 11. A user can readily extend and retract the cord 6 while the snap lock tabs 9 are disengaged.

Figure 6:
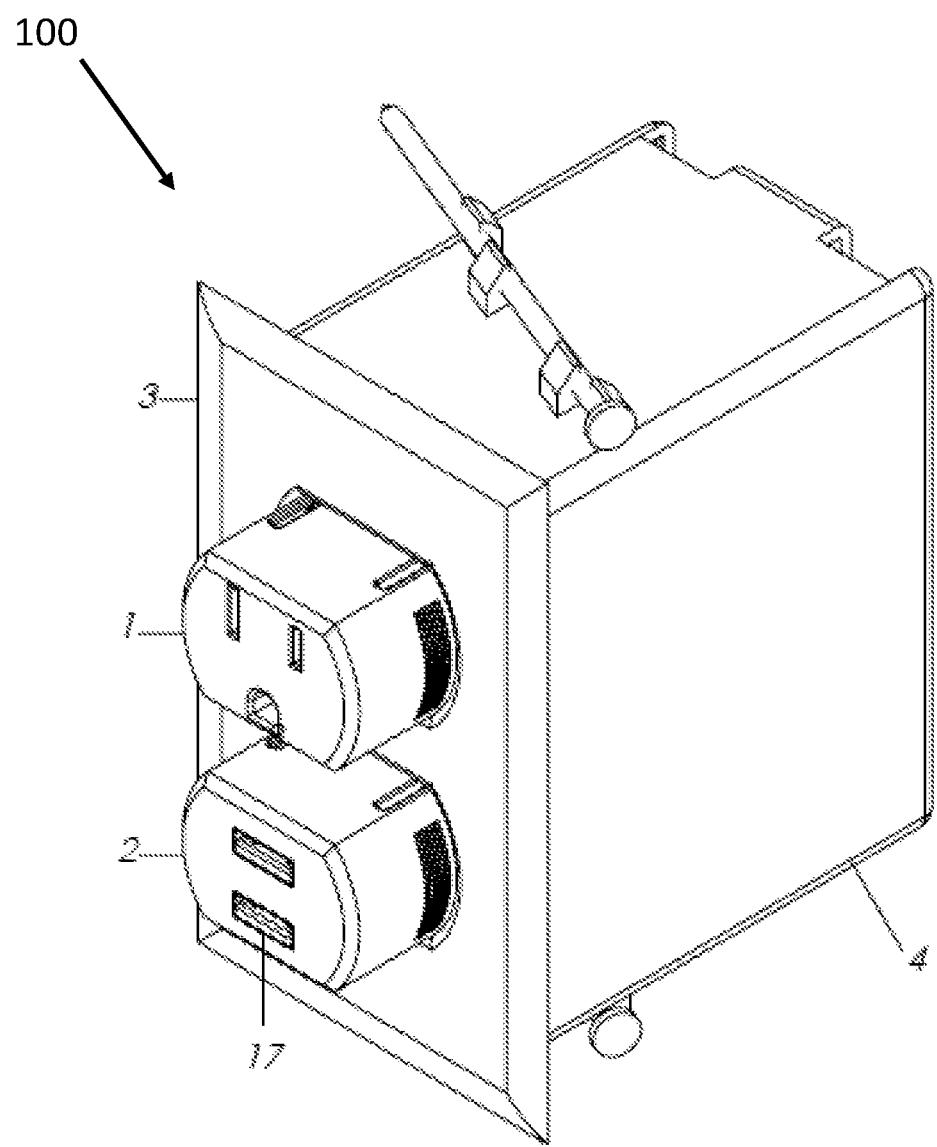
FIG. 6 illustrates a perspective view of embodiment 100 with the sockets fully retracted toward the electrical gang box.

Turning to FIG. 6, there is shown a perspective view of embodiment 100 with the sockets 1, 2 fully retracted to gang box 4.

Figure 7:
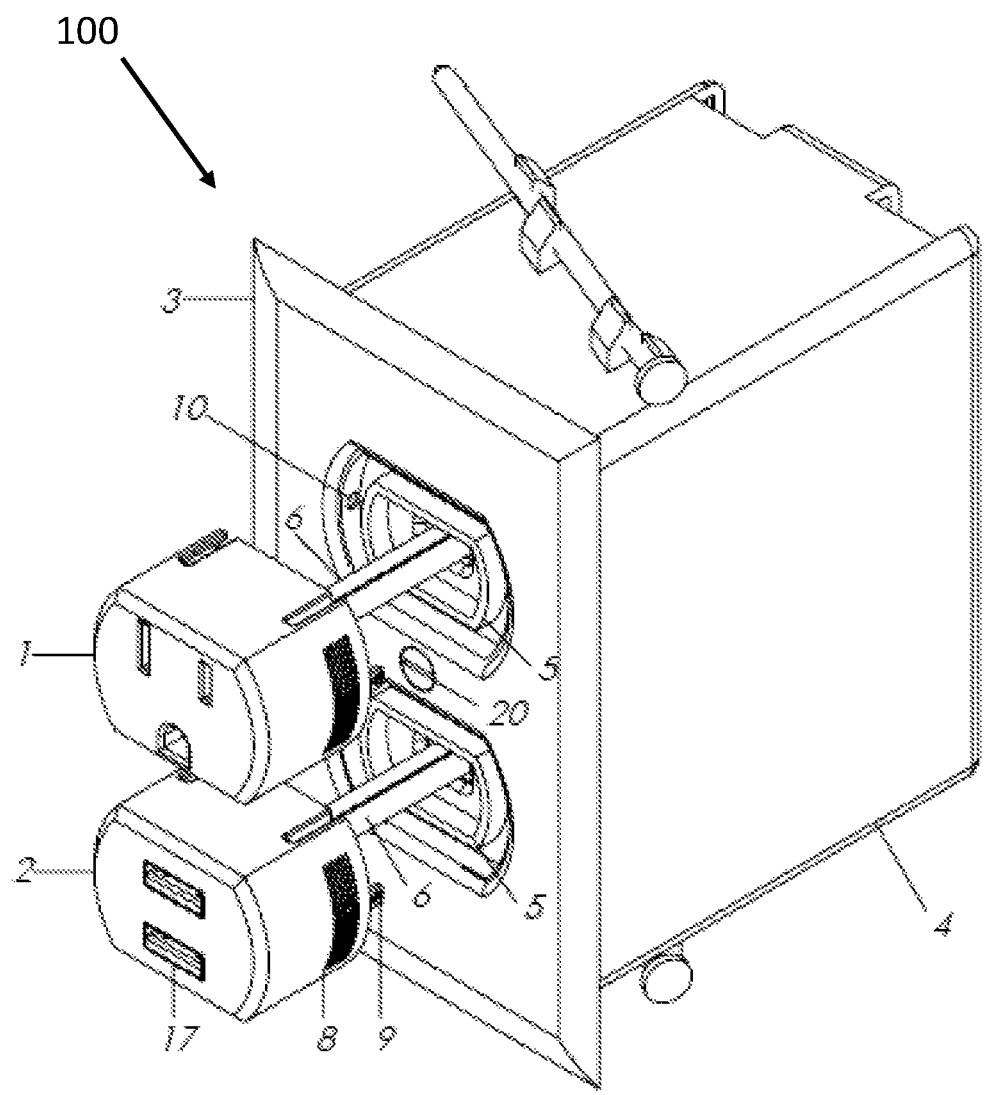
FIG. 7 illustrates a perspective view of embodiment 100 with the sockets and cords partially extended.

Turning to FIG. 7, there is shown a perspective view of embodiment 100 with the sockets 1, 2 and cords 6 partially extended. The outlet base 11 has snap lock recess holes 10 for engaging snap lock tabs 9. Since each socket 1, 2 has two snap lock tabs, the outlet base 11 has two snap lock recess holes 10 in each outlet for a total of four recess holes 10. An outlet base 11 (shown in FIG. 8) has two wall mount cradles 5 in embodiment 100. Wall mount cradles 5 provide support for sockets 1, 2 when they are retracted.

Figure 8:
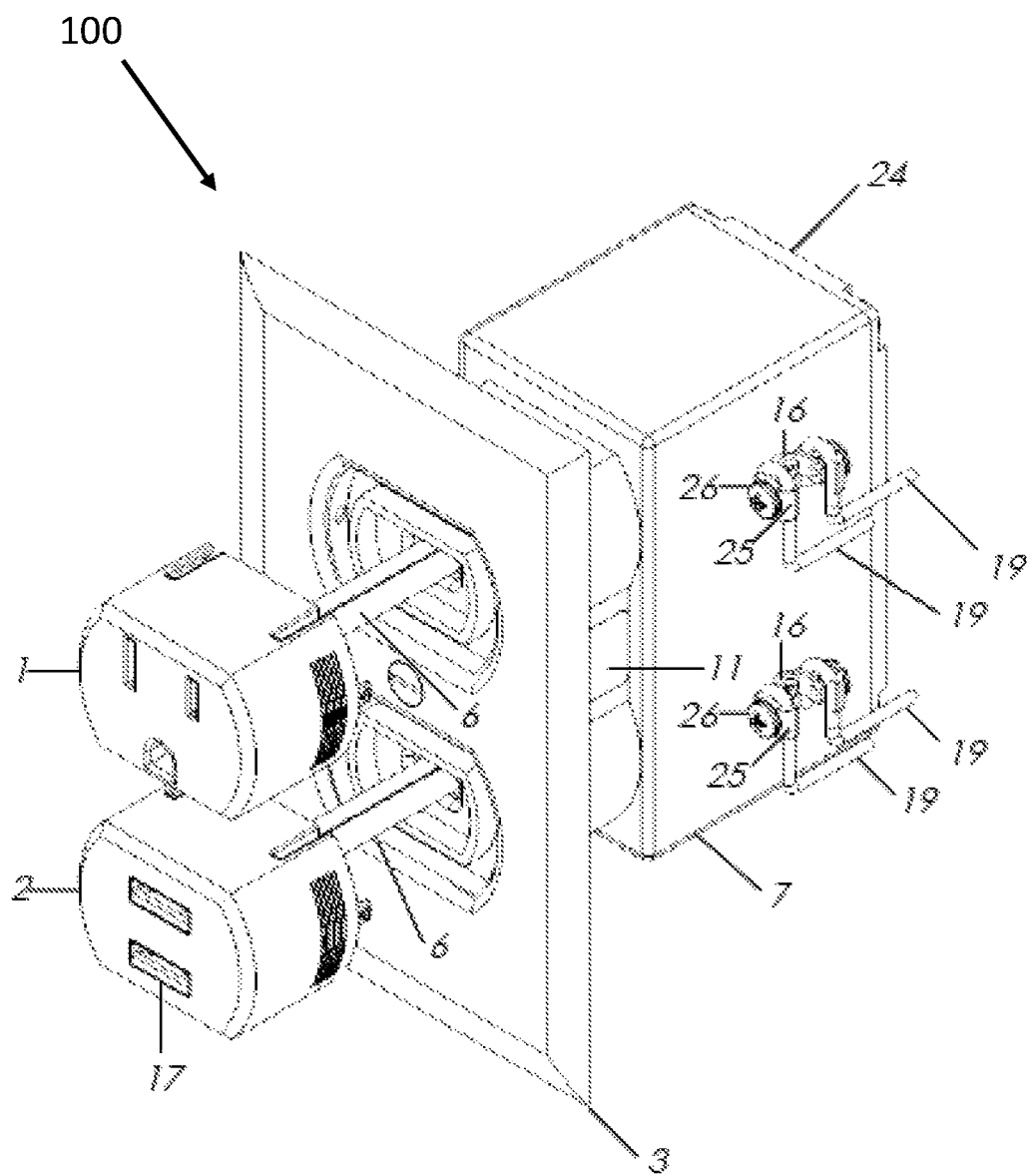
FIG. 8 illustrates a perspective view of embodiment 100 with the sockets and cords partially extended.

Turning to FIG. 8, there is shown a perspective view of embodiment 100 with the sockets 1, 2 and cords 6 partially extended. Gang box 4 is hidden in this view so that the internal components are visible. A dual outlet housing 7 contains the cord 6 (not visible) and other components of the assembly. Dual outlet housing 7 is designed to house two dynamic electrical sockets 1, 2. Dual outlet housing 7 includes electrical wiring 19, which may be 110V-120V wiring, such as Romex cable, another non-metallic (NM) cable or the like. Voltage wire clamps 25 are fastened around electrical wiring 19 using wire clamp mounting screws 26. Further, dual outlet housing 7 includes spring drum mounting screws 16 for securing spring drum assemblies (not visible). The outlet base 11 is positioned between dual outlet housing 7 and the wall outlet cover 3. An outlet housing back cover 24 secures the back of dual outlet housing 7 but may be removed as needed to access the interior of outlet housing 7.

Figure 9:
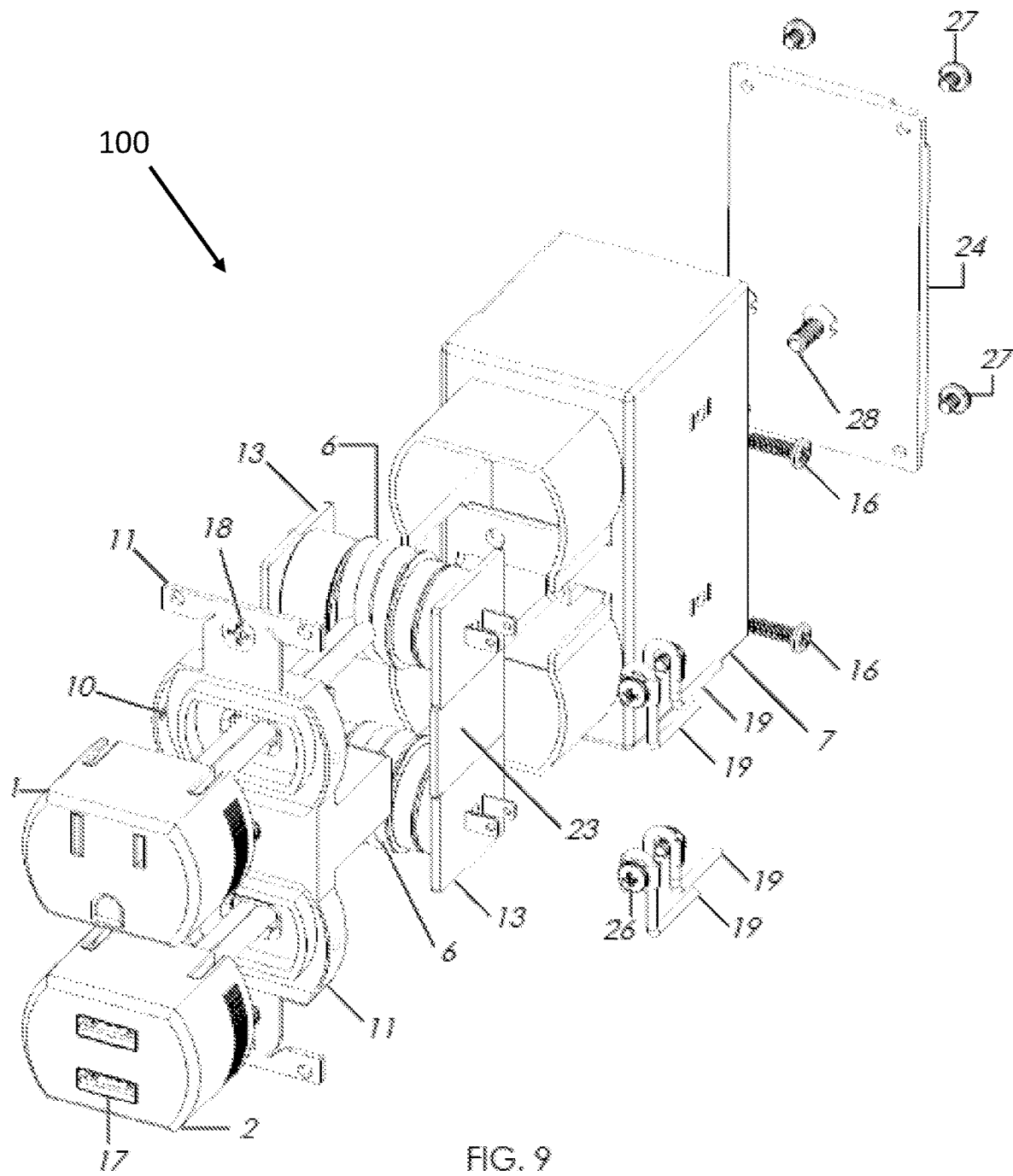
FIG. 9 illustrates an exploded perspective view of embodiment 100 with the sockets and cords partially extended.

Turning to FIG. 9, there is shown an exploded perspective view of embodiment 100 with the sockets 1, 2 and cords 6 partially extended. The wall outlet cover 3 has been removed in this exploded view. Outlet mounting fasteners 18 are used to fasten the outlet base 11 to the gang box 4. Mounting screws 28 are used to mount the dual outlet housing 7 to outlet base 11. Two cords 6 connected to the sockets 1, 2 are shown partially extended with the remainder of the cords 6 wrapped securely around two spring drum assemblies 13. As will be known to those of ordinary skill in the art, a step down converter printed circuit board (PCB) 23 is employed to step-down higher input voltage to a lower output voltage. The spring drum mounting screws 16, electrical wiring 19, and wire clamp mounting screws 26 are shown detached from dual outlet housing 7 for illustration purposes. The outlet housing back cover 24 is shown detached and may be fastened to dual outlet housing 7 using outlet housing screws 27.

Figure 10:
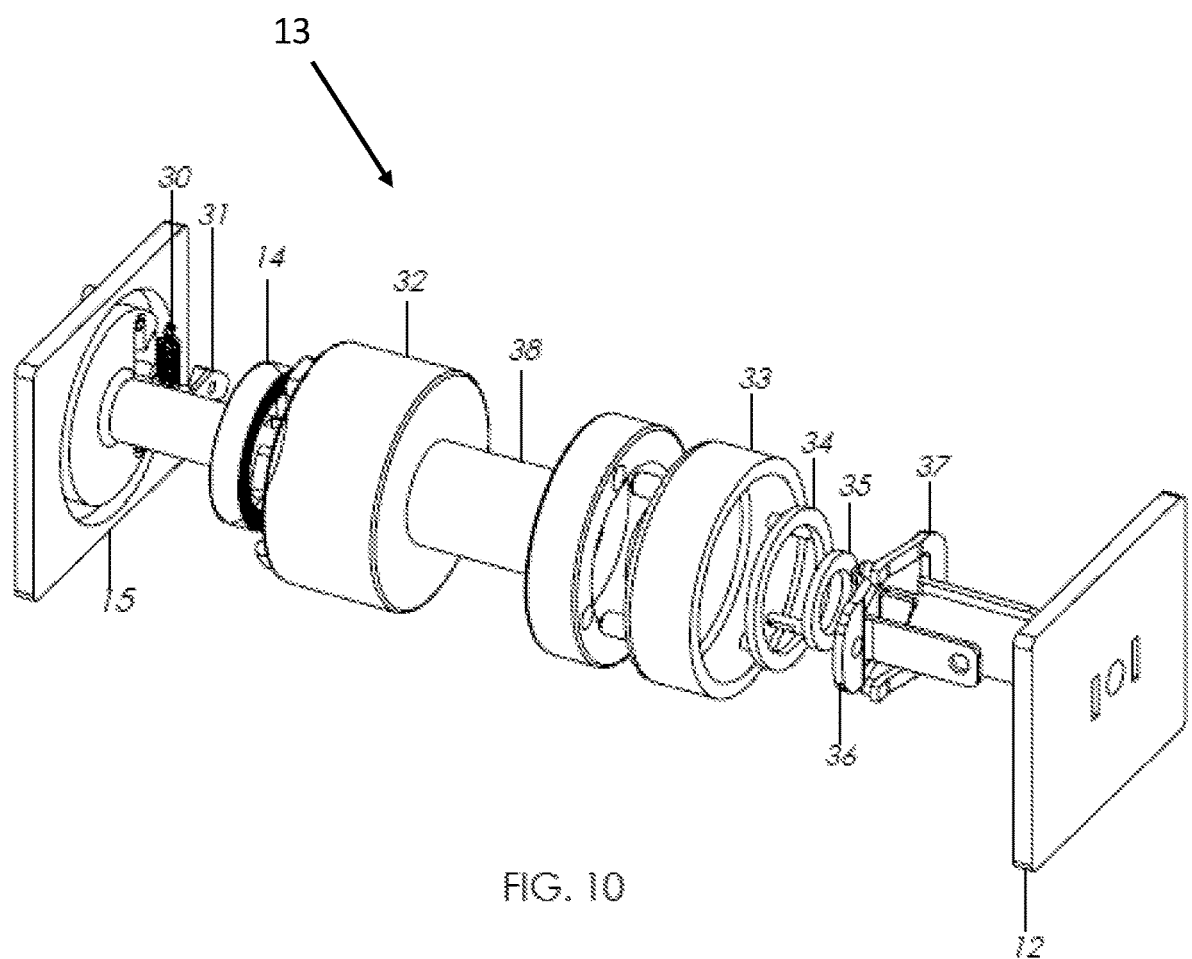
FIG. 10 illustrates an exploded perspective view of a spring drum assembly used in various embodiments of the disclosed invention.

Turning to FIG. 10, there is shown an exploded perspective view of a spring drum assembly 13 used in various embodiments of the disclosed invention. The spring drum assembly 13 has four primary components: a large drum mount 32, a small drum mount 33, a RM-1 mount 12, and a LM-1 mount 15. The large drum mount 32 holds the constant force spring 14 and the cord 6 (not visible here). The small drum mount 33 holds the large track electrical contact 34 and the small track electrical contact 35. The RM-1 mount 12 holds the small spring electrical contact 36 and the large spring electrical contact 37. The LM-1 mount 15 holds the tension spring 30 and the rotary catch 31. Another term for rotary catch 31 is a spring finger mechanism.

When the spring drum assembly 13 is assembled, the drum barrel/shaft 38 rotates around the RM-1 mount 12 and the LM-1 mount 15. RM-1 (right) mount 12 and LM-1 (left) mount 15 function together as a two piece interlocking mechanism with drum shaft 38. The RM-1 12 and LM-1 15 mounts are securely fastened to the side walls of outlet housing 7 using spring drum mounting screws 16. With cross reference to FIG. 9, as a user pulls three prong socket 1 or USB socket 2, the cord 6 extends out away from spring drum assembly 13. As the cord 6 begins extending, the constant force spring 14 tightens and the rotary catch 31 begins to index. Rotary catch 31 functions as a catch and release for boss features that are designed into the face of the large drum mount 32. Tension spring 30 is a spring that can be a standard type extension spring or rubber spring. Its 30 function is to apply tension to rotary catch 31 to hold in the horizontal when in contact with the catch bosses that are on the end of large drum mount 32. The boss features include a feature enabling the cord 6 to be locked as it extends. Further, the boss features include a feature enabling the cord 6 to be released from a locked position and retracted. The large drum mount 32 will lock in increments as the drum shaft 38 rotates and the cord 6 extends. The locked increments are very small which enables a user to extend the cord 6 to many different lengths. The "release feature" is commonly known in the art and refers to the individually designed bosses that are on the end of large drum mount 32. The bosses are shaped differently, one boss shape allows the rotary catch 31 to hold the spring drum assembly 13 in place when the cord 6 is extended out to a certain length. Then, when the cord 6 is slightly pulled the drum assembly 13 will engage on a boss release feature enabling the cable 6 to be retracted back toward outlet housing 7. The illustration of spring drum assembly 13 is a non-limiting example and it should be understood that its components may be rearranged differently. Similarly, components such as the rotary catch 31, boss features, and the electrical contacts 34, 35 may be modified and still remain within the scope of the invention.

Figure 11:
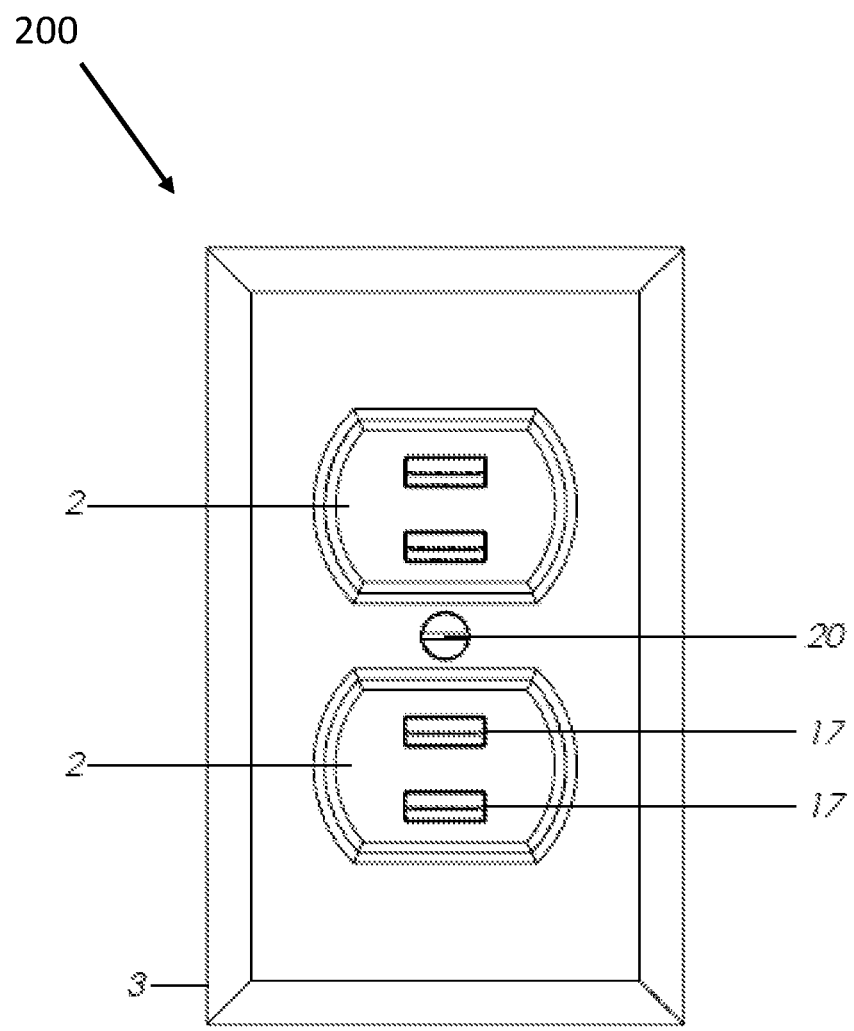
FIG. 11 illustrates a front view of an embodiment 200 with two dynamic USB sockets.

Turning to FIG. 11, there is shown a front view of an embodiment 200 with two dynamic USB sockets 2. Although both USB sockets 2 are shown with two USB ports 17, different quantities may be implemented. For example, the top dynamic USB socket could have one port 17 and the bottom socket 2 could have two ports 17. Similar to other embodiments, a mounting screw 20 is used to secure the wall outlet cover 3 to an outlet base 11 (not visible). Although FIGS. 2-10 are described in detail regarding embodiment 100, the features shown in these figures are identical to the features of embodiment 200, with the exception being the use of two dynamic USB sockets 2 in embodiment 200 instead of the different dynamic sockets 1, 2 in embodiment 100.

Figure 12:
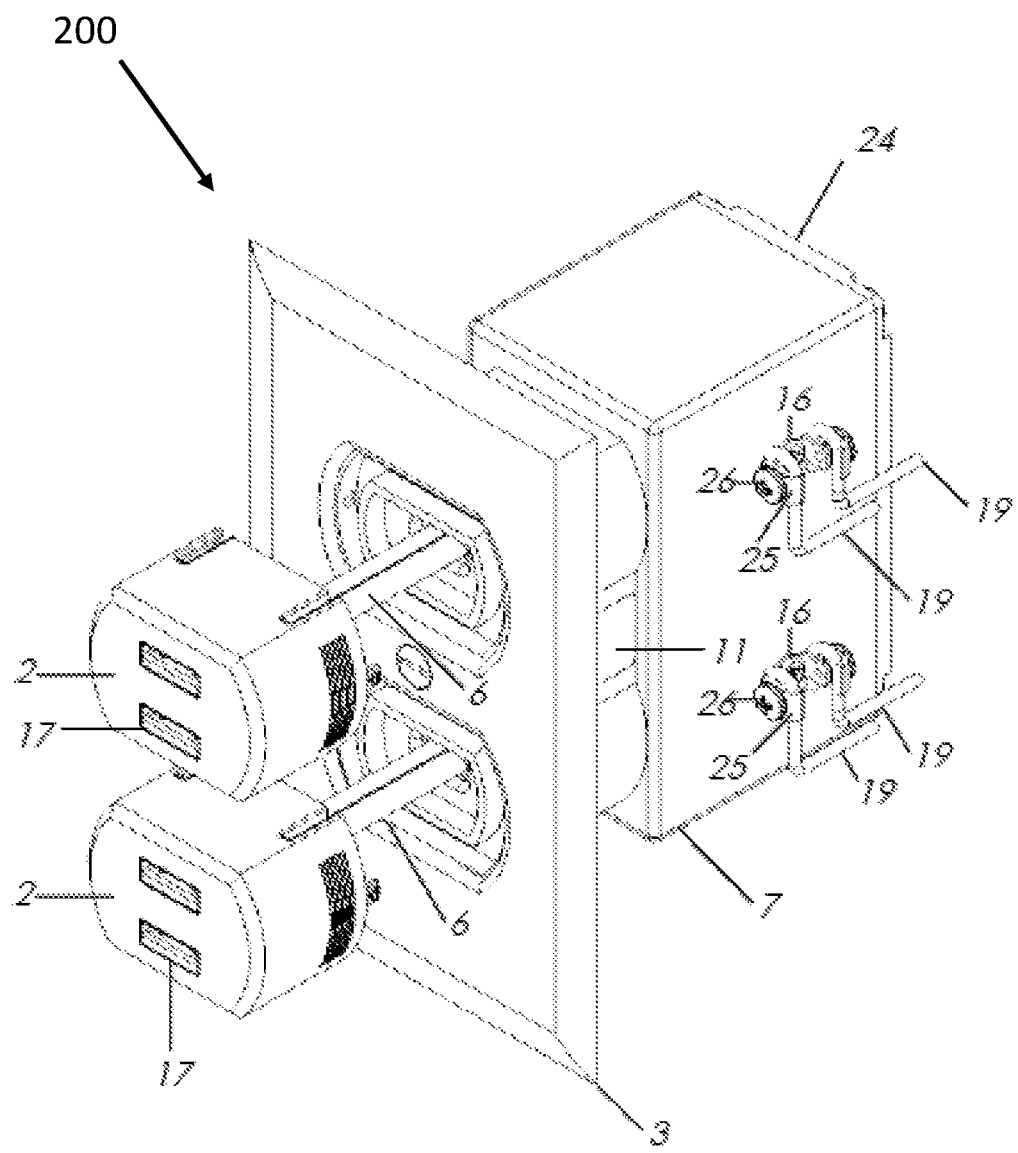
FIG. 12 illustrates a perspective view of embodiment 200 with the sockets and connected cords partially extended.

Turning to FIG. 12, there is shown a perspective view of embodiment 200 with both sockets 2 and connected cords 6 partially extended. Gang box 4 is hidden in this view so that the internal components are visible. A dual outlet housing 7 contains the cord 6 (not visible) and other components of the assembly. Dual outlet housing 7 is designed to house two dynamic electrical sockets 2. Dual outlet housing 7 includes electrical wiring 19, which may be 110V-120V wiring, such as Romex cable or another non-metallic (NM) cable. Voltage wire clamps 25 are fastened around electrical wiring 19 using wire clamp mounting screws 26. Further, dual outlet housing 7 includes spring drum mounting screws 16 for securing spring drum assemblies (not visible). An outlet base 11 is positioned between dual outlet housing 7 and the wall outlet cover 3. An outlet housing back cover 24 secures the back of dual outlet housing 7 but may be removed as needed to access the interior of dual outlet housing 7.

Figure 13:
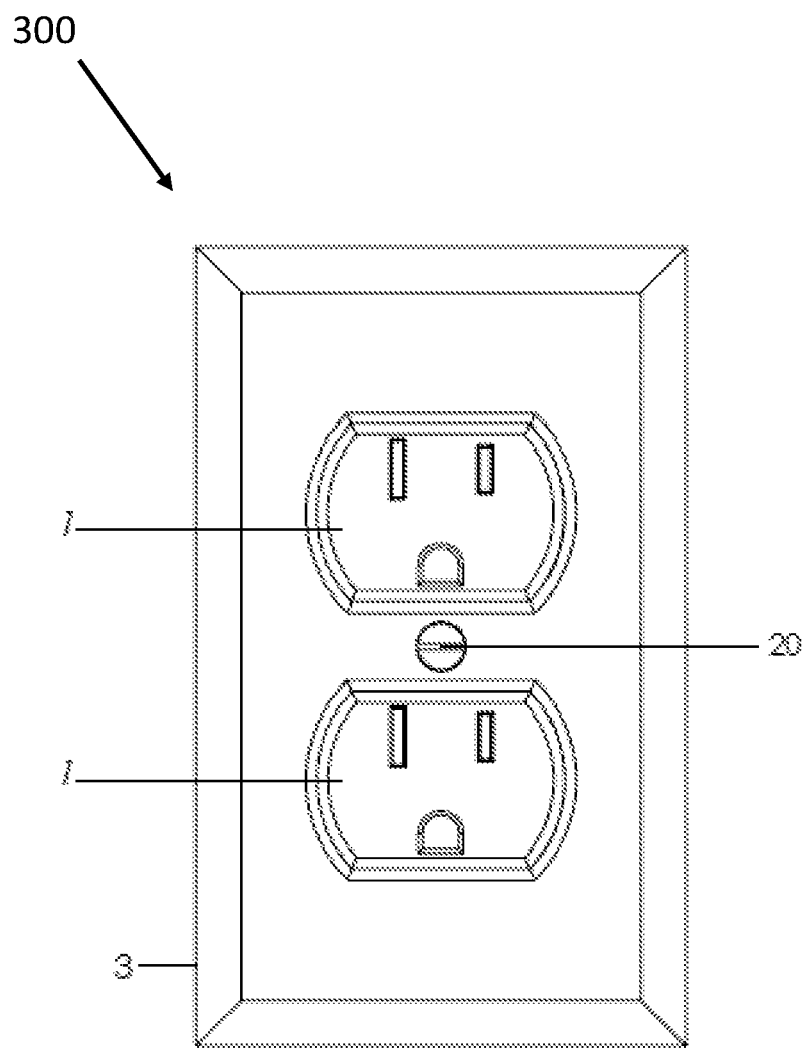
FIG. 13 illustrates a front view of an embodiment 300 with two dynamic three prong sockets.

Turning to FIG. 13, there is shown a front view of an embodiment 300 with two dynamic three prong sockets 1. Similar to other embodiments, a mounting screw 20 is used to secure the wall outlet cover 3 to an outlet base 11 (not visible). Dual outlet housing 7 (not visible) is designed to house two dynamic electrical sockets 1. Although FIGS. 2-10 are described in detail regarding embodiment 100, the features shown in these figures are identical to the features of embodiment 300, with an exception being the use of two dynamic three prong sockets 1 in embodiment 300 instead of the different sockets 1, 2 in embodiment 100. Another exception is the absence of a step down converter printed circuit board (PCB) 23.

Figure 14:
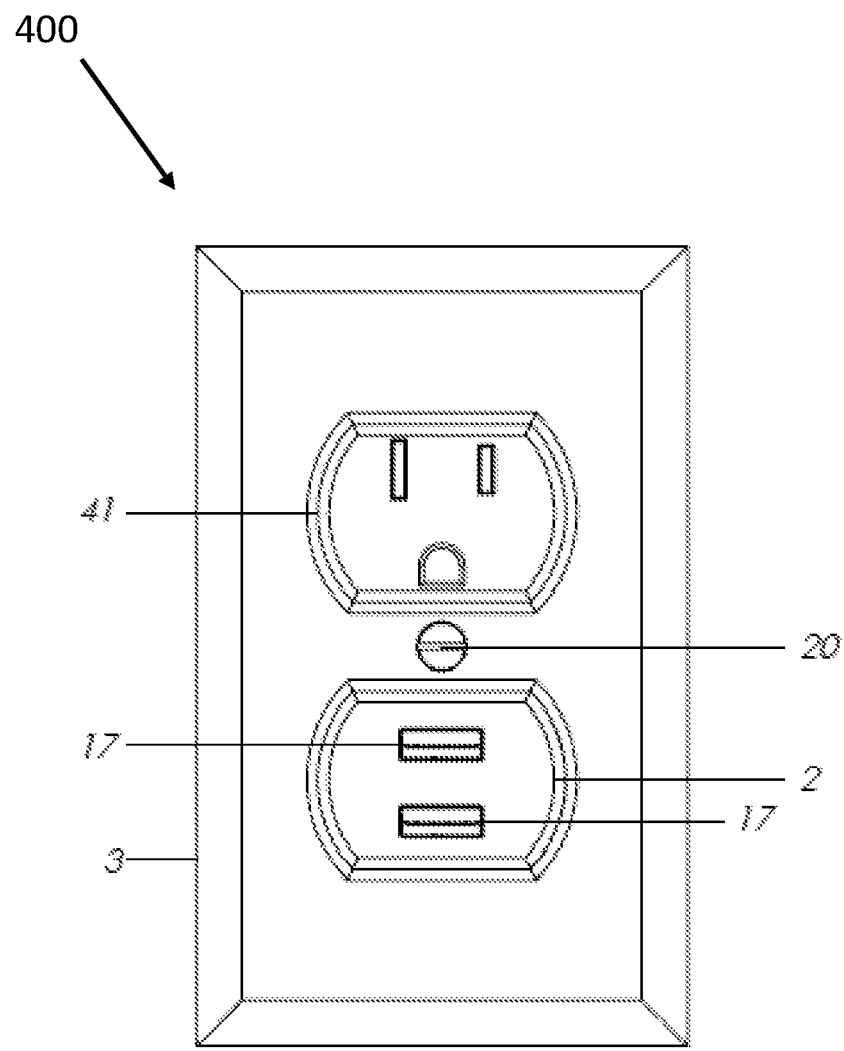
FIG. 14 illustrates a front view of an embodiment 400 with a static three prong socket and a dynamic USB socket.

Turning to FIG. 14, there is shown a front view of an embodiment 400 with a static three prong socket 41 and a dynamic USB socket 2. Similar to other embodiments, a mounting screw 20 is used to secure the wall outlet cover 3 to an outlet base 21 (not visible). Although FIGS. 2-10 are described in detail regarding embodiment 100, the features shown in these figures are similar to the features of embodiment 400, with a few exceptions. Such exceptions include a static three prong socket 41, only one spring drum assembly 13, a different outlet housing 29, and other details described below in reference to FIG. 15.

Figure 15:
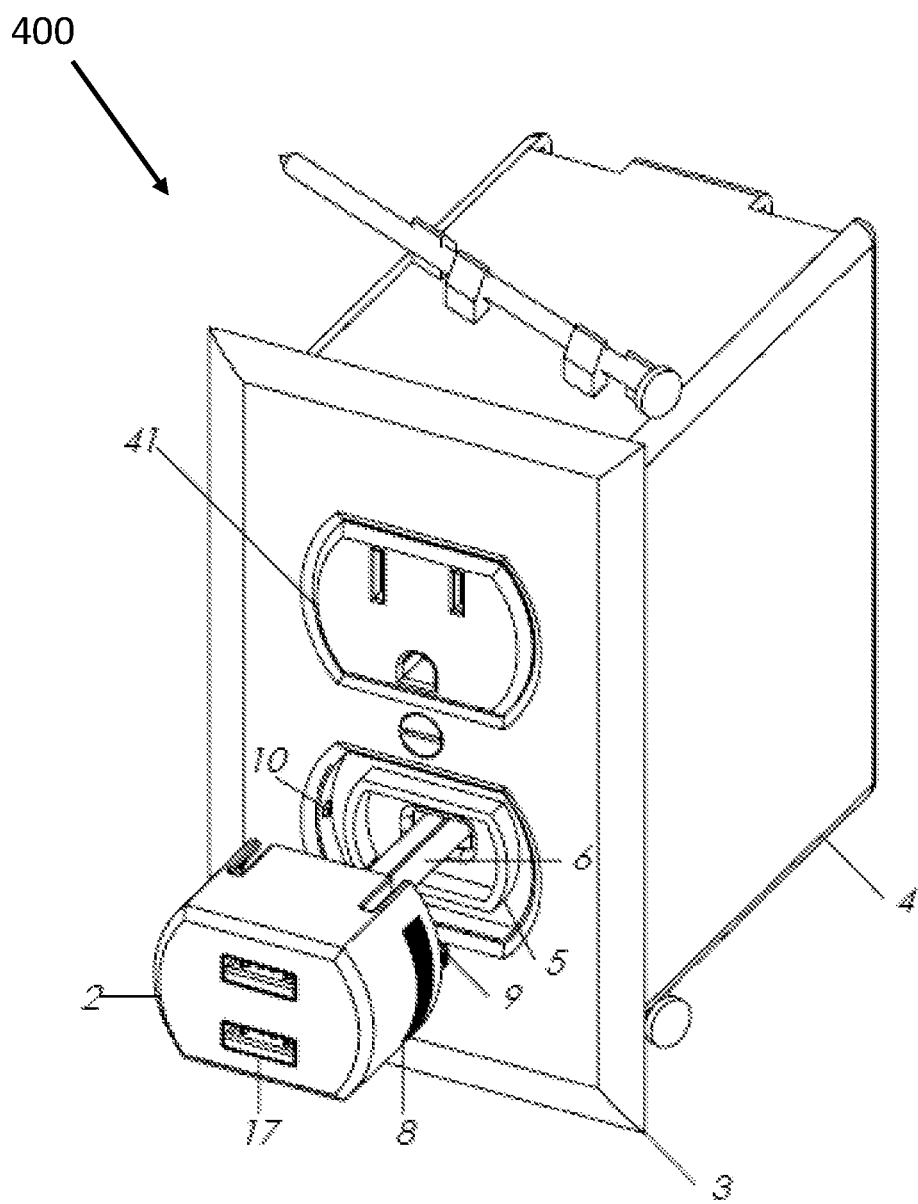
FIG. 15 illustrates a perspective view of embodiment 400 with the USB socket and connected cord partially extended.

Turning to FIG. 15, there is shown a perspective view of embodiment 400 with the USB socket 2 and connected cord 6 partially extended. The outlet base 21 (shown in FIG. 16) has snap lock recess holes 10 for engaging snap lock tabs 9. USB socket 2 has two snap lock tabs and the outlet base 21 has two snap lock recess holes 10. As shown, the USB outlet has a wall mount cradle 5 to provide support for socket 2 when it is retracted.

Figure 16:
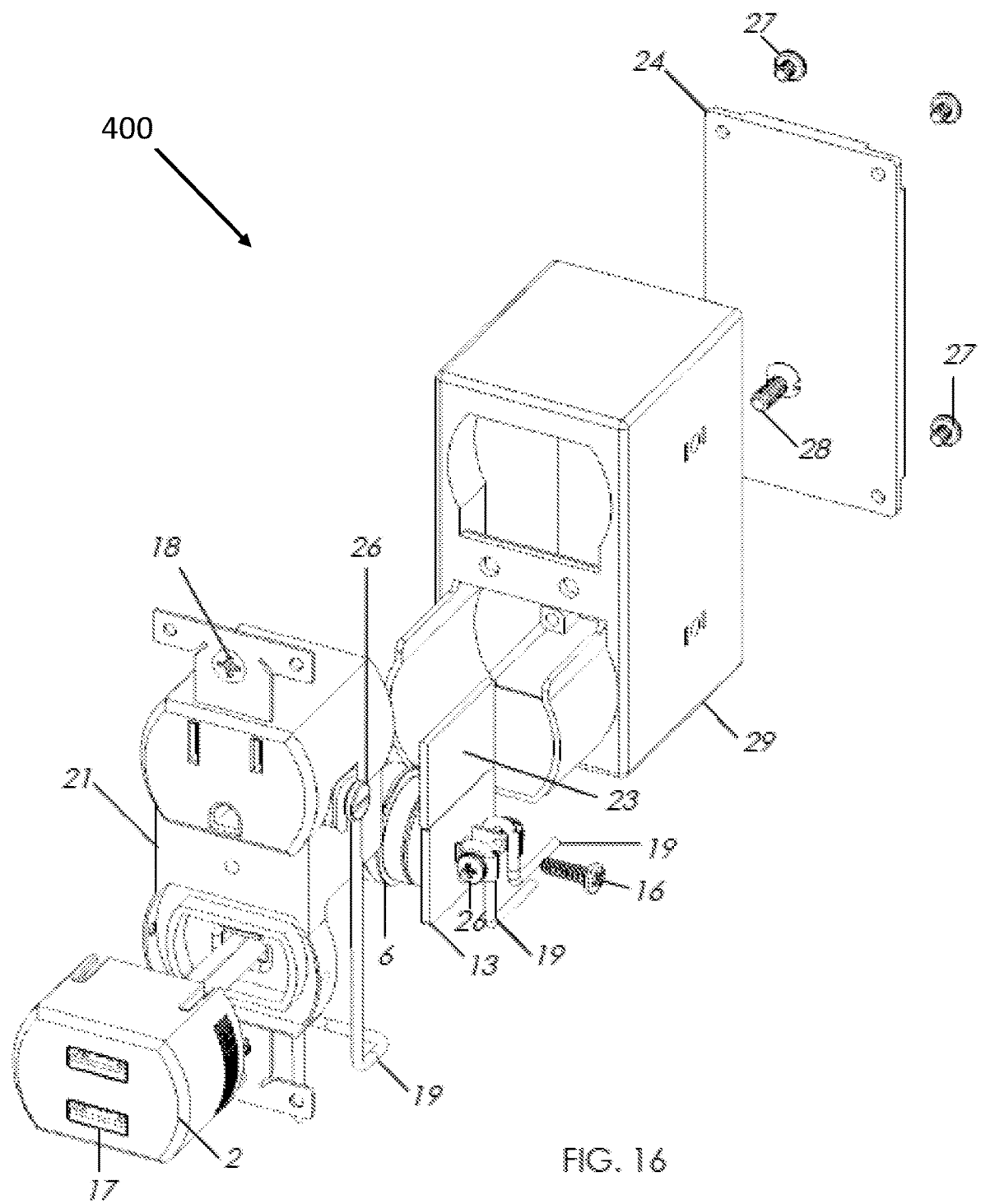
FIG. 16 illustrates an exploded perspective view of embodiment 400 with the USB socket partially extended.

Turning to FIG. 16, there is shown an exploded perspective view of embodiment 400 with the USB socket 2 partially extended. The wall outlet cover 3 has been removed in this exploded view. Outlet mounting screws 18 are used to fasten the outlet base 21 to the gang box 4 (not visible). Outlet base 21 is a single retractable outlet base as opposed to dual retractable outlet base 11. Mounting screws 28 fasten the outlet housing 29 to outlet base 21. Outlet housing 29 differs from outlet housing 7 in that it is designed to house one dynamic electrical socket 2 and one static electrical socket 41. One cord 6 is shown partially extended with the remainder of the cord 6 wrapped securely around the spring drum assembly 13. As will be known to those of ordinary skill in the art, a step down converter printed circuit board (PCB) 23 is employed to step-down higher input voltage to a lower output voltage. For the dynamic USB socket 2, the spring drum mounting screw 16, electrical wiring 19, and wire clamp mounting screws 26 are shown detached from the outlet housing 29 for illustration purposes. Having only one spring drum assembly 13 for the outlet base 21 also changes the wiring 19 layout of embodiment 400. As shown, the wire clamp mounting screw 26 is affixed perpendicularly to the outlet base 21 and the wiring 19 is oriented differently than embodiment 100 (shown in FIG. 9). The outlet housing back cover 24 is shown detached and may be fastened to outlet housing 29 using outlet housing screws 27.

Figure 17:
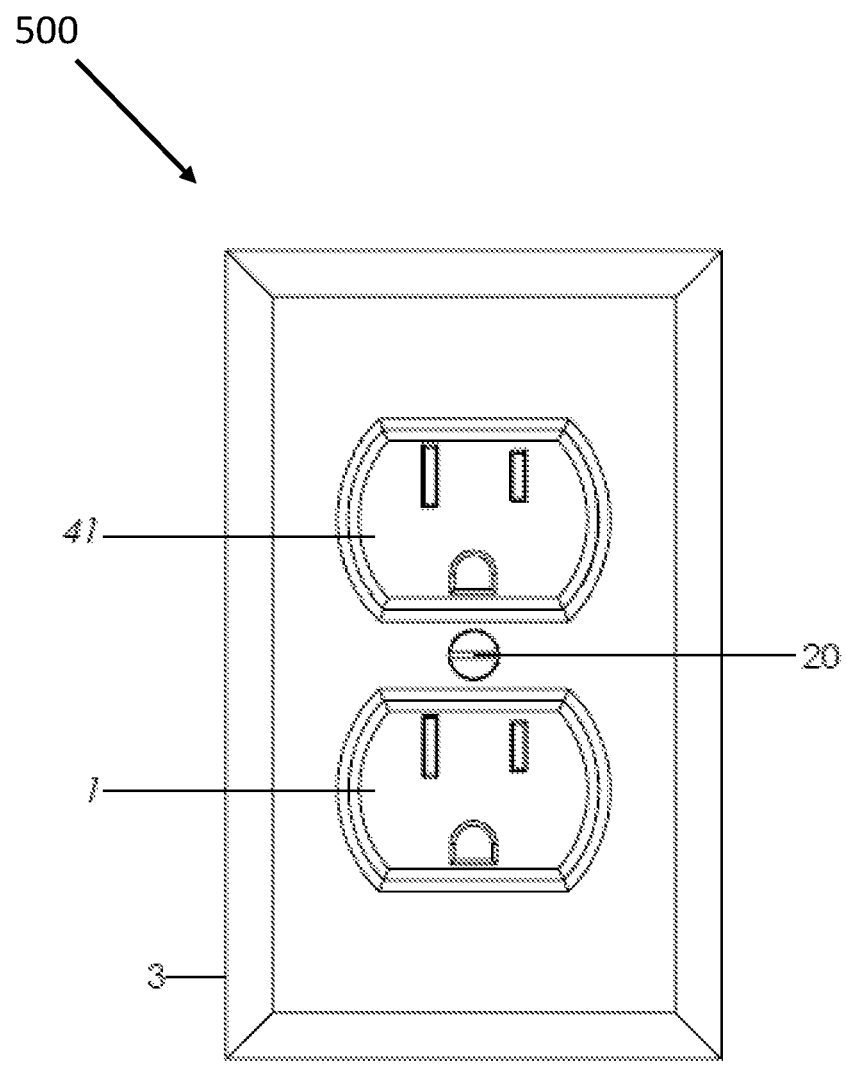
FIG. 17 illustrates a front view of an embodiment 500 with a static three prong socket and a dynamic three prong socket.

Turning to FIG. 17, there is shown a front view of an embodiment 500 with a static three prong socket 41 and a dynamic three prong socket 1. Similar to other embodiments, a mounting screw 20 is used to secure the wall outlet cover 3 to an outlet base 21 (not visible). Although FIGS. 2-10 are described in detail regarding embodiment 100, the features shown in these figures are similar to the features of embodiment 500, with a few exceptions. Such exceptions include a static three prong socket 41, only one spring drum assembly 13, a different outlet housing 29, and other details described below in reference to FIG. 18. Another exception is the absence of a step down converter printed circuit board (PCB) 23.

Figure 18:
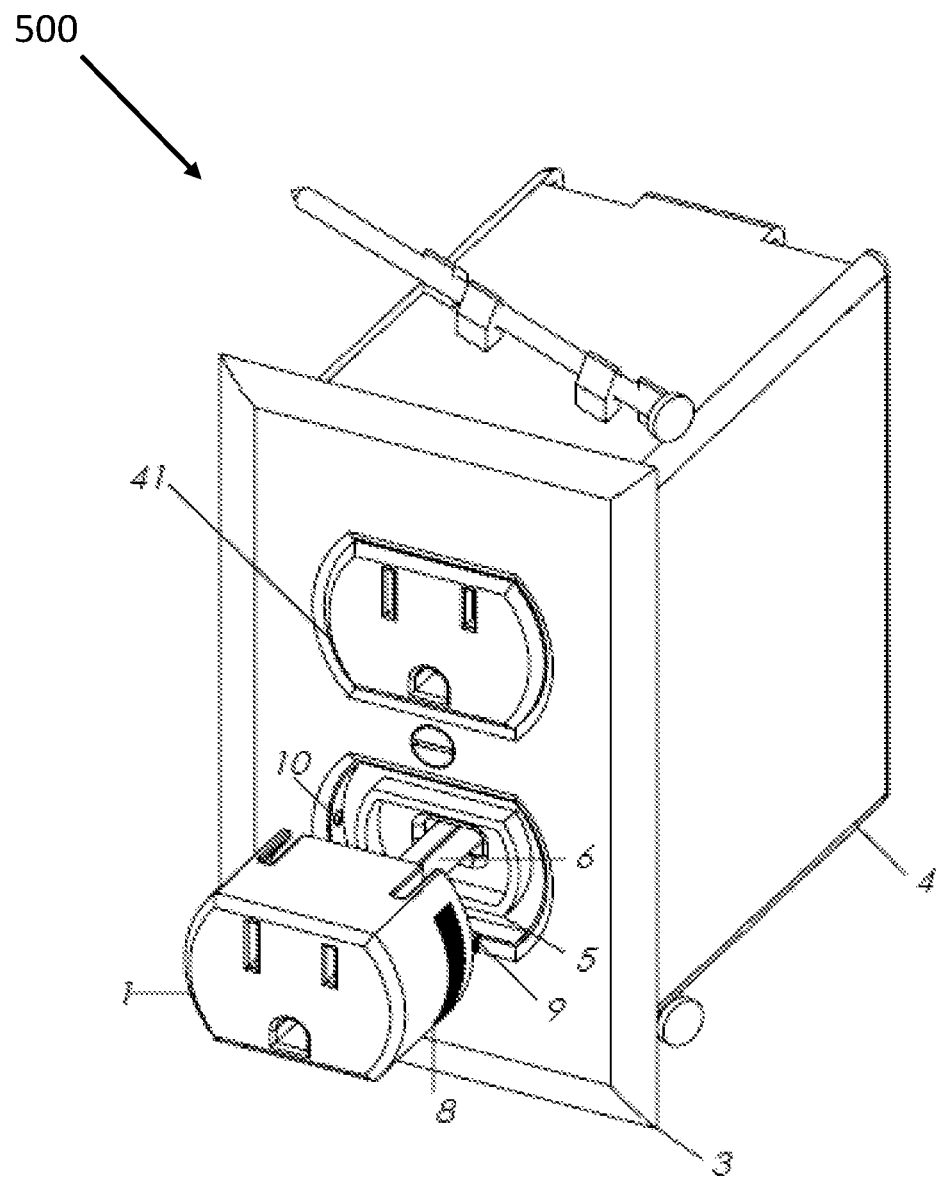
FIG. 18 illustrates a perspective view of embodiment 500 with the three prong socket partially extended.

Turning to FIG. 18, there is shown a perspective view of embodiment 500 with the three prong socket 1 partially extended. The outlet base 21 has snap lock recess holes 10 for engaging snap lock tabs 9. Dynamic three prong socket 1 has two snap lock tabs and the outlet base 21 has two snap lock recess holes 10. As shown, the three prong outlet has a wall mount cradle 5 to provide support for socket 1 when it is retracted.

Figure 19:
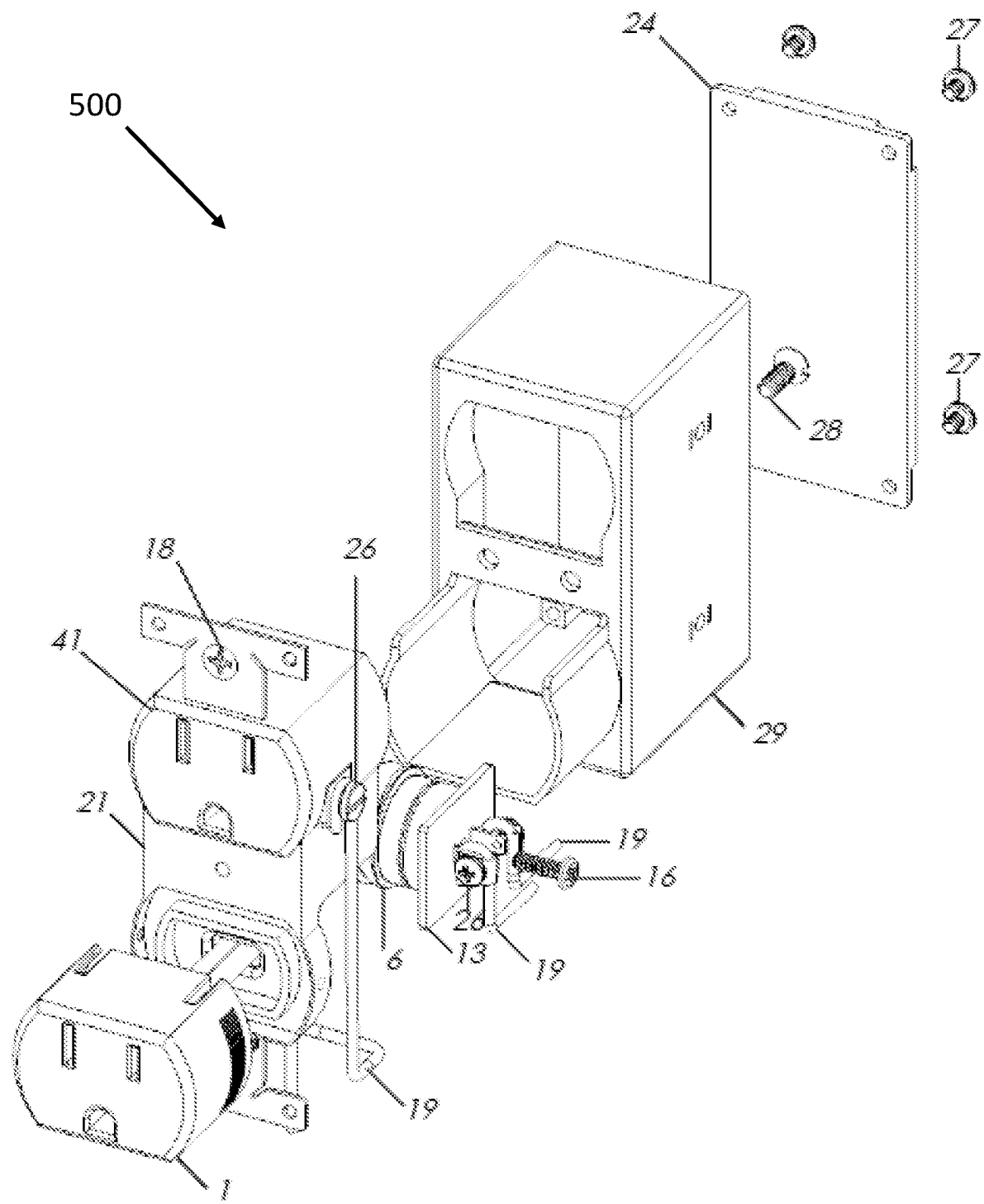
FIG. 19 illustrates an exploded perspective view of embodiment 500 with the three prong socket partially extended.

Turning to FIG. 19, there is shown an exploded perspective view of embodiment 500 with the three prong socket 1 partially extended. The wall outlet cover 3 has been removed in this exploded view. Outlet mounting screws 18 are used to fasten the outlet base 21 to the gang box 4 (not visible). Mounting screws 28 fasten the outlet housing 29 to outlet base 21. Outlet housing 29 differs from outlet housing 7 in that it is designed to house one dynamic electrical socket 1 and one static electrical socket 41. One cord 6 is shown partially extended with the remainder of the cord 6 wrapped securely around the spring drum assembly 13. For the dynamic three prong socket 1, the spring drum mounting screw 16, electrical wiring 19, and wire clamp mounting screws 26 are shown detached from the outlet housing 29 for illustration purposes. Having only one spring drum assembly 13 for the outlet base 21 also changes the wiring 19 layout of embodiment 500. As shown, the wire clamp mounting screw 26 is affixed perpendicularly to the outlet base 21 and the wiring 19 is oriented differently than embodiment 100 (shown in FIG. 9). The outlet housing back cover 24 is shown detached and may be fastened to outlet housing 29 using outlet housing screws 27.

What is claimed is:

1. An electrical retrofit kit system, the system comprising:
   an electrical outlet gang box;
   at least one dynamic electrical socket;
   at least one dynamic cord;
   an outlet base;
   outlet mounting fasteners connecting the outlet base to the electrical outlet gang box;
   at least one spring drum assembly; and
   an outlet housing configured to retrofit within the electrical outlet gang box.

2. The electrical retrofit kit apparatus of claim 1, wherein the at least one dynamic electrical socket comprises a three prong socket and a USB socket.

3. The electrical retrofit kit apparatus of claim 1, wherein the at least one dynamic electrical socket comprises two USB sockets.

4. The electrical retrofit kit apparatus of claim 1, wherein the at least one dynamic electrical socket comprises two three prong sockets.

5. The electrical retrofit kit apparatus of claim 1 further comprising a static three prong socket.

6. The electrical retrofit kit apparatus of claim 5, wherein the at least one dynamic electrical socket comprises a USB socket.

7. The electrical retrofit kit apparatus of claim 5, wherein the at least one dynamic electrical socket comprises a three prong socket.

8. The electrical retrofit apparatus of claim 1, wherein the electrical outlet gang box is a 1-gang box.

9. The electrical retrofit apparatus of claim 1, wherein the electrical outlet gang box is a 2-gang box.

10. The electrical retrofit apparatus of claim 1, wherein the electrical outlet gang box is a 3-gang box.

11. A method for retrofitting an electrical system, the method comprising:
    providing an electrical outlet gang box;
    providing at least one dynamic electrical socket;
    connecting at least one dynamic cord to the at least one dynamic electrical socket;
    connecting an outlet base to the at least one dynamic electrical socket;
    connecting an outlet housing to the outlet base;
    connecting the outlet base to the electrical outlet gang box using outlet mounting fasteners;
    connecting at least one spring drum assembly to the at least one dynamic cord; and
    connecting the at least one spring drum assembly to the outlet housing, the outlet housing being configured to retrofit within the electrical outlet gang box.

12. The method of claim 11, wherein the at least one dynamic electrical socket comprises a three prong socket and a USB socket.

13. The method of claim 11, wherein the at least one dynamic electrical socket comprises two USB sockets.

14. The method of claim 11, wherein the at least one dynamic electrical socket comprises two three prong sockets.

15. The method of claim 11 further comprising: providing a static three prong socket.

16. The method of claim 15, wherein the at least one dynamic electrical socket comprises a USB socket.

17. The method of claim 15, wherein the at least one dynamic electrical socket comprises a three prong socket.

18. The method of claim 11, wherein the electrical outlet gang box is a 1-gang box.

19. The method of claim 11, wherein the electrical outlet gang box is a 2-gang box.

20. The method of claim 11, wherein the electrical outlet gang box is a 3-gang box.

\* \* \* \* \*